July 31, 1962  E. WILDHABER  3,046,844
METHOD OF AND MACHINE FOR PRODUCING CROWNED TEETH
Filed Nov. 19, 1958  5 Sheets-Sheet 1

INVENTOR:
Ernest Wildhaber

INVENTOR:
Ernest Wildhaber

FIG. 13

July 31, 1962 E. WILDHABER 3,046,844
METHOD OF AND MACHINE FOR PRODUCING CROWNED TEETH
Filed Nov. 19, 1958 5 Sheets-Sheet 3

INVENTOR:
Ernest Wildhaber

July 31, 1962 E. WILDHABER 3,046,844
METHOD OF AND MACHINE FOR PRODUCING CROWNED TEETH
Filed Nov. 19, 1958 5 Sheets-Sheet 4

INVENTOR:
Ernest Wildhaber

July 31, 1962  E. WILDHABER  3,046,844
METHOD OF AND MACHINE FOR PRODUCING CROWNED TEETH
Filed Nov. 19, 1958  5 Sheets-Sheet 5

INVENTOR:
Ernest Wildhaber

United States Patent Office 3,046,844
Patented July 31, 1962

3,046,844
METHOD OF AND MACHINE FOR PRODUCING CROWNED TEETH
Ernest Wildhaber, Brighton, N.Y.
(124 Summit Drive, Rochester 20, N.Y.)
Filed Nov. 19, 1958, Ser. No. 774,928
22 Claims. (Cl. 90—4)

The present invention relates to the production of crowned tooth sides particularly on gear-coupling members and also on spur gears and helical gears, wherein a tool rotates in time with a workpiece.

Where crowning is achieved in a hobbing process the hob is ordinarily fed to cut deeper at the tooth ends. In other words the normal tooth depth is altered.

One object of the present invention is to provide an exact method and machine for simultaneously producing opposite sides of crowned teeth without altering the normal tooth depth.

A related object is to provide a novel method and machine for simultaneously and accurately producing opposite crowned tooth sides on a gear-coupling member having tooth bottoms that lie on a spherical surface centered on the axis of said member, even though the tooth sides are more crowned than corresponds to the tooth bottoms.

Another aim is to provide a method and machine for simultaneously producing on a gear-coupling member opposite crowned tooth sides that have a markedly varying curvature longitudinally of the teeth, and tooth sides whose curvature radii longitudinally of the teeth increase materially from the tooth center to the tooth ends. Also externally toothed members of high load capacity shall be produced, that are each adapted to run with an internally toothed member at a fixed or nearly fixed shaft angularity.

Another object is to provide a method and machine employing a tool of generally cylindrical form, having equal diameters at opposite ends, for producing more crowned or differently crowned tooth sides than correspond to the shape of the tooth bottom, wherein the cutting portions of the tool are arranged in a helical thread, or in a plurality of helical threads or teeth.

Another aim is to provide an efficient method and machine capable of accurately producing such tooth sides and employing a pair of rotary tools that are separate from and movable relatively to each other.

A further object is to provide a method and machine of the said character that employs a pair of rotary tools engaging diametrically opposite sides of a workpiece, the two tools operating on opposite tooth sides.

The tools referred to may be hobs, shaving tools, grinding members with helical threads and abrading members in general.

A further aim is to provide an improved method and machine for producing crowned teeth according to the basic principles disclosed in my pending patent application entitled "Toothed Couplings," filed May 7, 1956, Serial No. 582,961, now Patent No. 2,927,510, granted March 8, 1960.

Other objects will appear in the course of the specification and in the recital of the appended claims. These objects may be attained singly or in any combination.

In the drawings:

FIGURES 1 to 11 are diagrams explanatory of the principles underlying the present invention.

FIG. 19 also applies to the machine of FIGURES 15 and 16.

Figures 1, 2, 3, 4, 5, 6, 7, 8, 9, 10, 11:
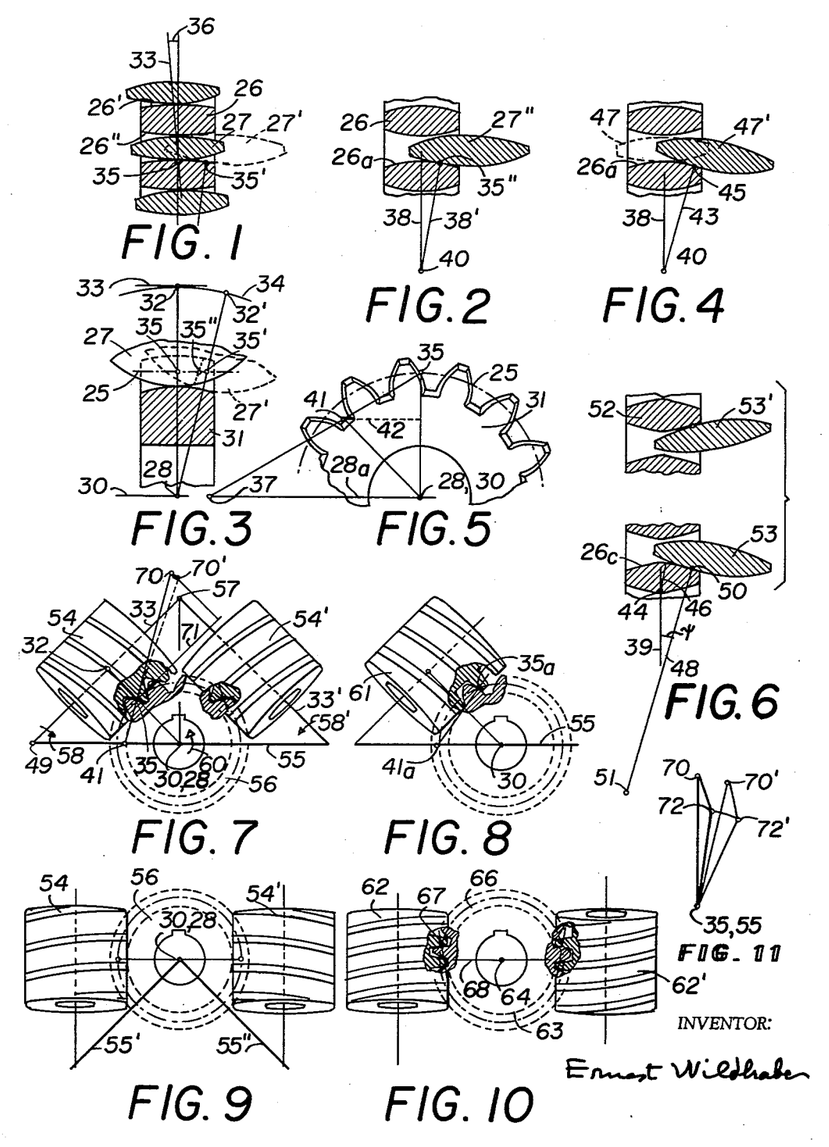
FIG. 1 is a fragmentary development of a mean cylindrical section of a gear-coupling member, shown in engagement with the thread of a hob or other rotary tool. The cylindrical section represents what may be called a pitch surface, 25 in FIGS. 3 and 4.
FIG. 2 is a fragmentary development like FIG. 1, but showing tooth sides that are more crowned, also showing a tool position.
FIG. 3 is a fragmentary axial section of a gear-coupling member such as that of FIG. 1, showing also the hob and its feed path. The same feed path is used for producing the gear-coupling member shown in FIG. 2, the additional crowning being attained by a progressive change in the hob timing.
FIG. 4 is a fragmentary development of the gear-coupling member illustrated in FIG. 2, shown with a differently fed tool and illustrating a further way of producing this member in accordance with the present invention.
FIG. 5 is a fragmentary end view of a gear-coupling member, such as that of FIGS. 2 and 4.
FIG. 6 is a fragmentary development of two portions of a cylindrical pitch surface of a further form of gear-coupling member, the two portions being engaged by a pair of tools.
FIG. 7 is a diagrammatic axial view of a gear-coupling member engaged by a pair of threaded tools of opposite hand, illustrating one aspect of the invention.
FIG. 8 is an axial view similar to FIG. 7, showing how crowning can be controlled by changing the generating pressure angle of the tool.
FIG. 9 is an axial view similar to FIG. 7, but showing the pair of threaded tools, such as hobs, disposed on diametrically opposite sides of a workpiece.
FIG. 10 is an axial view of a spur gear in engagement with a pair of hobs of the same hand, illustrating a way of attaining crowned tooth sides without cutting deeper at the tooth ends, that is without adding a depthwise feed motion.
FIG. 11 is a diagram explanatory of a computation procedure.

FIGURES 1 and 2 refer to gear-coupling members, and are fragmentary developments to a plane of a mean cylindrical section coaxial with the member. The cylindrical sectional surface may be considered a reference surface or pitch surface. It is denoted at 25 in FIGURES 3 and 5, and defines the nature of the teeth.

The sides 26′, 26″ of the teeth 26 (FIG. 1) have an approximately constant curvature in this developed section, all along their length. They may be produced as in conventional manner by feeding a rotating hob 27 about a center 28 (FIGS. 3 and 5) that lies on the axis 30 of the member 31. Hereby the central point 32 of the hob axis 33 describes a circular arc 34 about center 28. It may be considered moving about an axis 28a (FIG. 5).

FIGURES 1 and 3 show the mean or central hob position in full lines. A further feed position is shown in dotted lines 27′. The dotted lines shown in FIG. 1 represent the section of a hob thread convolution with the plane into which the cylindrical surface 25 is developed. In this feed position the central point 32 of the hob axis has moved to 32′. Contact with the hob thread is at point 35′, while in the central hob position it is at pitch point 35. The hob may be set to its lead angle 36 (FIG. 1).

In common practice the pressure angle or profile inclination of the hob matches the pressure angle or profile inclination of the teeth at pitch point 35. The surface normal 35—37 (FIG. 5) at point 35 intersects axis 28a at 37; and it can be demonstrated that distance 28—37 equals the curvature radius at point 35 of the sides 26′, 26″, FIG. 1.

In most cases smaller curvature radii are desired, that is more crowning. This is commonly accomplished by altering the tooth bottom, that is by cutting deeper at the ends of the teeth. Thus, instead of feeding a hob about center 28, it may be fed about a center lying between points 28 and 35. This known practice is quite feasible when the shaft angularities are small and large tooth numbers are used. In general, however, the teeth tend to be undercut at their ends, where the depth is increased, and much valuable tooth contact is apt to be lost.

The present invention avoids cutting deeper at the tooth ends, and in its preferred embodiments produces tooth bottoms that lie on a spherical surface centered at 28. It makes use of one or more of several factors that enable it to control the curvature of the tooth sides without changing the tooth bottoms, while preserving the spherical tooth bottom centered at 28.

One of these factors is a timing change between the hob or rotary tool and the workpiece during the feed motion. It can be considered an added or subtracted turning motion of the hob at a predetermined varying rate. Only the turning motion is altered, while the bodily feed of the hob with respect to the workpiece remains unchanged. FIG. 2 relates to this case of controlling the longitudinal tooth curvature with timing. 27″ denotes a section through a convolution of the hob thread identical with section 27′ of FIG. 1. But it has a slightly different position axially of the hob. It is shifted towards side 26a in accordance with the timing change or change in hob turning angle. Contact is made at a point 35″, also shown in FIG. 3, offset from radial line 28—32′. A hob or tool operates here only on one side of the teeth at a time. The normal 38′ to tooth side 26a (FIG. 2) intersects the central line 38 at a point 40 which is approximately the curvature center of side 26a in this development.

Another factor that permits to control the longitudinal curvature of the teeth is the axis about which the hob or tool is fed. Thus a hob fed about an axis 28—41 (FIG. 5) produces pitch lines whose mean curvature radius equals distance 42 of point 41 from central line 28—35. This is illustrated in FIG. 4 on substantially the same workpiece as shown in FIG. 2. Dotted lines 47 represent a section through a hob convolution in the central feed position. The off-center section 47′ through a hob convolution is tilted with respect to section 47. It contacts side 26a at a point 45, whose normal 43 passes approximately through point 40 also shown in FIG. 2.

While the developed longitudinal profile 26a, or pitch line, is about uniformly curved, FIG. 6 refers to longitudinal profiles 26c of varying curvature. Profile 26c is most curved in the middle portion, the curvature center being at 44 and 46 being the curvature radius there. The curvature radius 48 at point 50 adjacent the tooth end is much larger and equal to distance 50—51. 51 is the curvature center. Such shapes have been fully described in my aforesaid patent application. They are preferably used on gear couplings expected to run about equal periods at all shaft angularities within the design limit. At the larger shaft angularities fewer teeth are in contact than at small or zero shaft angularity, and there is more sliding. Teeth 52 as shown in FIG. 6 provide more intimate contact at the larger shaft angularities, to make up for the fewer teeth in contact and the increased sliding. The teeth 52 also have less backlash variation between zero and maximum shaft angularity, and may be used generally for this reason.

FIG. 6 shows the use of two hobs or tools 53, 53′. These are indicated each by a section through a hob-thread convolution. Each hob 53, 53′ is fed about an inclined axis as described with FIG. 4. The difference of the tooth shapes produced, as compared with those of FIG. 4, is attained by timing control. Although the timing change goes without bodily displacement, its effect is as if the hob had been shifted along its axis of rotation a distance proportional to the change in turning angle.

The two hobs 54, 54′ shown in FIG. 7 in their central feed position are fed about a common axis 55 that intersects the axis 30 of the workpiece 56 at right angles, at center 28. The hob axes 33, 33′ are inclined to the drawing plane of FIG. 7 in accordance with the lead angle of the hob. The drawing plane contains axis 55 and coincides with the central plane of rotation of the workpiece. Axes 33, 33′ intersect the drawing plane at the central hob point (32), and both axes 33, 33′ are inclined to the direction of axis 55 about which they are fed. They are offset from axis 55 by amounts depending on their lead angle settings. These amounts are relatively small, slightly smaller than the product of distance 32–49 times the trigonometric tangent of the lead angle setting of the respective hob, and smaller than the outside radius of the gear-coupling member or workpiece.

It has been explained in my aforesaid application that conventional feed of a hob about an axis 28a or 55 does not produce pitch lines that are exactly symmetrical with respect to the central plane of rotation, as required. Symmetrical pitch lines are obtained by providing a moderate timing change or timing correction.

In a preferred embodiment of the two hobs 54, 54′ of the pair are of opposite hand, one hob 54, being right hand and the other hob, 54′, being left hand. The hand of a hob is understood to be the hand of the thread in which its cutting edges lie. With hobs symmetrical to each other and of opposite hand the required timing correction is the same for both in each feed position. This simplifies the procedure.

With equally dimensioned rotary tools of opposite hand their axes 33, 33′ intersect at a point 57 that lies in a plane 30—57 perpendicular to the feed axis 55. Such intersection is especially useful when the rotary tools are a pair of shaving tools of opposite hand and of generally cylindrical form, each having cutting portions on one side only of its threads or teeth. The angle between their intersecting axes may be fixed. This angle is relatively small at the helix angles commonly used on shaving tools. Enough space is generally left adjacent point 57 to provide a pair of bevel gears with apex 57 to interconnect the two shaving tools. Rotation is applied either to the tools or to the workpiece, and the shaving contact rotates the workpiece or the tools respectively. The pair of tools is fed about axis 55 in one pass or in several passes, while it is being pressed radially towards axis 55 to cause working pressure.

In hobbing or grinding with threaded tool members positive timing between the tools and workpiece is desired. With equally dimensioned tools of opposite hand the above said timing correction is symmetrical with respect to the plane 30—57. If the timing correction is in the direction of arrow 58 on tool or hob 54, it is in the direction of arrow 58' on tool 54'. Also whatever timing changes are required for the control of crowing are symmetrical with respect to said plane 30—57.

Cutting motion of tool 54 in the direction of arrow 58 requires rotation of the workpiece 56 in the direction of arrow 60, and cutting motion of tool 54' in a direction opposite to arrow 58'. With tool pairs of opposite hand the resulting equal timing changes are in the direction of the tool rotation on one tool and in the direction opposite to the tool rotation on the other tool.

While the use of hobs or tools of opposite hand is preferred for simplicity, the invention can also be carried out with tools of the same hand. The part of the timing changes used for crowning control is here also in the direction of the tool rotation on one tool and opposite thereto on the other tool of the pair. The total timing changes of the two tools are however not exactly equal.

As is customary on hobs and threaded grinding members, these tools are adjustable for lead angle settings about an axis 28—32 at right angles to the hob axis (33). In such adjustment the hob axis describes a plane normal to axis 28—32. Preferably this plane, the adjustment plane of the hob axis, has a fixed inclination with respect to the feed axis 55, to simplify machine design. It includes an acute angle therewith. Such fixed inclination is practical because crowning control in several other ways is feasible.

A further factor that can be used for crowning control will now be described with FIG. 8. It is the selection of the hob pressure angle or profile inclination. The hob 54 of FIG. 7 has a thread matching the inclination of the tooth profile at the pitch point 35, the pitch point lying on center line 28—32. Here the hob pressure angle is equal to the pressure angle of the workpiece 56. The normal 35—41 at pitch point 35 corresponds exactly to the normal 35—41 of FIG. 5, and distance 35—41 is the curvature radius produced at point 35 in a normal section parallel to the axis 30 of the workpiece. The curvature radius of the developed pitch line (as in FIG. 2) equals the projection of this distance to a line perpendicular to the center line 28—32.

The hob 61 of FIG. 8 has a smaller profile inclination or pressure angle, such that the hob thread contacts the pitch circle point in a position 35a. The tooth surface normal 35a—41a remains tangent to the base circle of the involute central profile and intersects axis 55 at 41a. It can be demonstrated mathematically that distance 35a—41a is the curvature radius produced at the pitch point in a normal section parallel to the axis of the workpiece. It is substantially larger than the curvature radius 35—41 of FIG. 7, so that the teeth produced in accordance with FIG. 8 are less crowned. The amount of crowning is decreased by decreasing the hob pressure angle. It is increased by increasing the hob pressure angle, that is the profile inclination of the hob thread in which the cutting edges lie.

A further factor that may be used for crowning control is the use of a taper hob, as fully described in the named application.

In the embodiment illustrated with FIG. 9 the hobs 54, 54' are like the hobs of FIG. 7, but they are placed on diametrically opposite sides of the workpiece 56. The adjustment plane of each hob axis 33, 33' is inclined at the same angle to the respective feed axis 55', 55'' as in FIG. 7, but each hob has its own feed axis. Disposition of the hobs on diametrically opposite sides of the workpiece is desirable especially for roughing, and for completing from solid metal in a single cut, and can be used advantageously in all cases. With this disposition the continuous feed progresses equally between the cuts applied by the two hobs, so that the cutting load is shared about equally. In other words, the feed between the two hobs corresponds to half a turn of the workpiece, from hob 54 to hob 54' as well as from hob 54' to hob 54. Hob 54 is fed about axis 55', while hob 54' is fed about axis 55''. Both hobs are fed simultaneously from front to back of the workpiece, or from back to front if desired.

What applies to hobs also applies to threaded grinding members or abrading members, and the term "cutting" is used in its broad sense to include grinding and abrading.

*Cylindrical Gears*

FIG. 10 illustrates an application to hobbing spur gears with a pair of hobs 62, 62' of equal hand, set on diametrically opposite sides of the workpiece 63. The feed is here in the direction of axis 64 of the workpiece. Crowning is produced entirely by timing control, without cutting deeper at the tooth ends. As on gear-coupling members the two hobs are set to cut on opposite sides of the teeth. The timing is changed gradually and oppositely on the two hobs, so that when the cutting portions of one hob approach one side of the teeth under production, the cutting portions of the other hob approach the opposite side of said teeth. In other words, when the timing is changed on one hob to turn said hob additionally in the direction of its cutting motion, it is simultaneously changed on the other hob in a direction opposite to its cutting motion.

Helical gears may also be crown-hobbed in this manner, preferably also with a pair of hobs of the same hand. Here a helical feed motion in the direction of and about the axis of the workpiece, or the equivalent thereof, is effected between the hobs and the workpiece. Here also the timing is changed oppositely on the two hobs for crowning.

Two hobs permit a faster feed than where a single hob is used. With a faster feed the spacing of the feed marks is larger. To avoid increasing the depth of the feed marks, hobs are preferably used whose pressure angle is substantially smaller than the running pressure angle of the gears. It may be between zero and twelve degrees. The point where the tooth profile intersects the pitch circle 66 is then cut in a position 67 (FIG. 10) offset from center line 68. This decreases the curvature of the hob thread in a normal section laid through the helix tangent, and provides shallower feed marks, as can be demonstrated.

Broadly each of the rotary tools used in the present invention has cutting portions arranged in a line inclined to the peripheral direction of the tool. This line is generally a helix, and the cutting portions are then arranged in one or more helical threads on hobs and grinding members, and in helical threads or teeth on shaving tools and other tools.

*Computation Procedure*

We may start out from given pitch lines of the crowned teeth, as shown in FIGURES 1, 2, 4 and 6, and from a given profile inclination or pressure angle in the central plane of rotation, as at point 35, FIGS. 1, 3, 5.

Inasmuch as the internal member mating with these crowned teeth contains involute teeth, whose every tooth surface normal is tangent to the base cylinder and has a constant leverage with respect to the axis of rotation, every tooth surface normal of the externally toothed crowned member also has a constant leverage with respect to the axis of said crowned member. This is known as a characteristic of gear teeth transmitting uniform motion.

A force exerted along any tooth surface normal then exerts a constant turning moment on that crowned member. This determines the inclination to the cylindrical pitch surface of all the tooth surface normals of the given pitch line when the inclination of the normal at the center is given. This inclination is equal to the pressure angle.

When symbol $\varphi_n$ denotes the normal pressure angle, that is the inclination of the surface normal to the cylindrical pitch surface or to its tangent plane at the considered point, and when the inclination of the projected normal (48, FIG. 6) to the central plane of rotation (39) is denoted $\psi$, then the following formula fulfills the above-named requirement:

$$\cos \varphi_n \cdot \cos \psi = \cos \varphi_o$$

Herein $\varphi_o$ is the pressure angle at the center, where the inclination $\psi$ is zero.

This relationship can also be expressed geometrically: FIG. 7 shows the tooth surface normal 35—70 in the central plane of rotation of member 56. Dotted line 35—70' gives the direction of the tooth surface normal at any other point, such as point 50 of FIG. 6. Line 35—70' is obtained by turning line 35—70 about an axis 71 that extends through point 35 in peripheral direction. It is turned to the position in which the lateral inclination is attained. In all turning positions about axis 71 the peripheral component of vector or force 35—70 remains constant, because axis 71 extends in peripheral direction.

Diagram FIG. 11 is a view taken in the direction of the feed axis (55, FIG. 7). In this view the normal 35—70 appears vertical. 35—70' can be readily determined in this view with the known laws of projection. In FIG. 11 a line 35—72 is drawn parallel to the hob axis, when the hob is in its central feed position and hob contact is at point 35. A distance equal to 35—70 of FIG. 7 is plotted thereon and projected to FIG. 11, to obtain point 72. The angle in space between radii 35—70 and 35—72 is equal to the angle between the surface normal and the direction of the hob axis. It is constant for all normals of the hob thread, which in its mathematically exact form is an involute helicoid. Line 35—72 is turned about axis 55 until it reaches the position 35—72' where it includes the last-named angle (in space) with the direction 35—70'. This position can be computed with spherical trigonometry. It represents the feed position of the hob.

Then the leverage of the tooth surface normal 48 with respect to this position of the hob axis is computed, and if it differs from the given constant amount, normal 48 is turned through an assumed small angle about the axis 30 of the workpiece. Likewise line 35—70' (FIG. 7) is turned through the same angle about an axis parallel to axis 30 and passing through point 35. The procedure is repeated and interpolated until the leverage requirement is fulfilled, and the contact position of normal 48 is thereby determined.

Then the turning position of the hob is determined when its thread passes through the known position of pitch point 50 and compared with the known turning position of the workpiece, to determine the required hob timing in the feed position when point 50 is generated. The hob timing and feed position can be determined in the same way for other points of the given pitch line.

The required hob timing can also be experimentally determined, for instance by cutting a workpiece without timing change or with a given timing pattern, measuring the difference of the shape produced and the shape required, and computing the required timing from said difference.

Machine

Figures 12, 14:
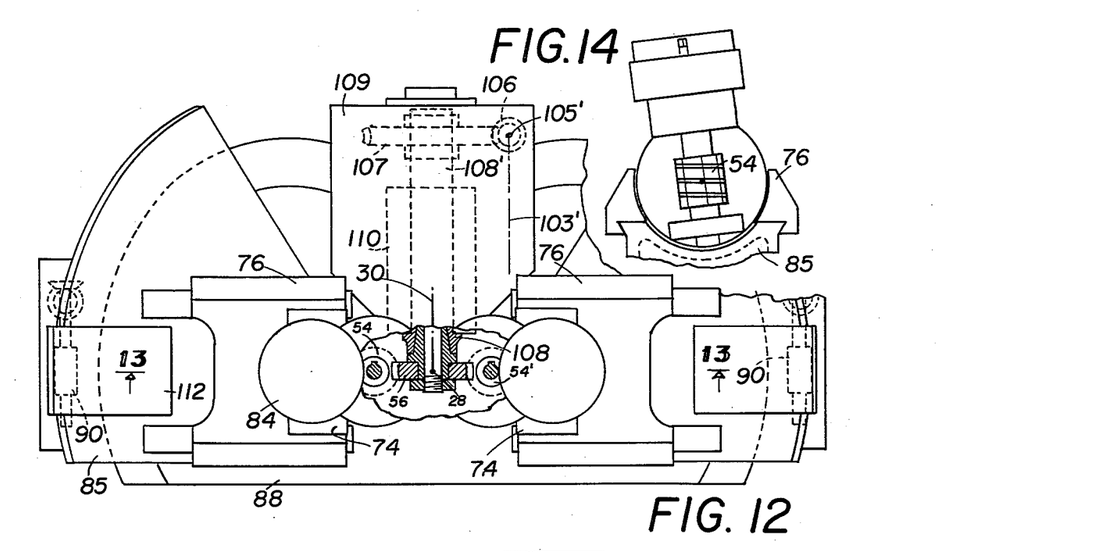
FIG. 12 is a plan view and partly a section laid through the axis of the work support of a machine for carrying out the method of the present invention.
FIG. 14 is a front view of a tool support, taken in the direction of its swivel axis.
Figure 13:
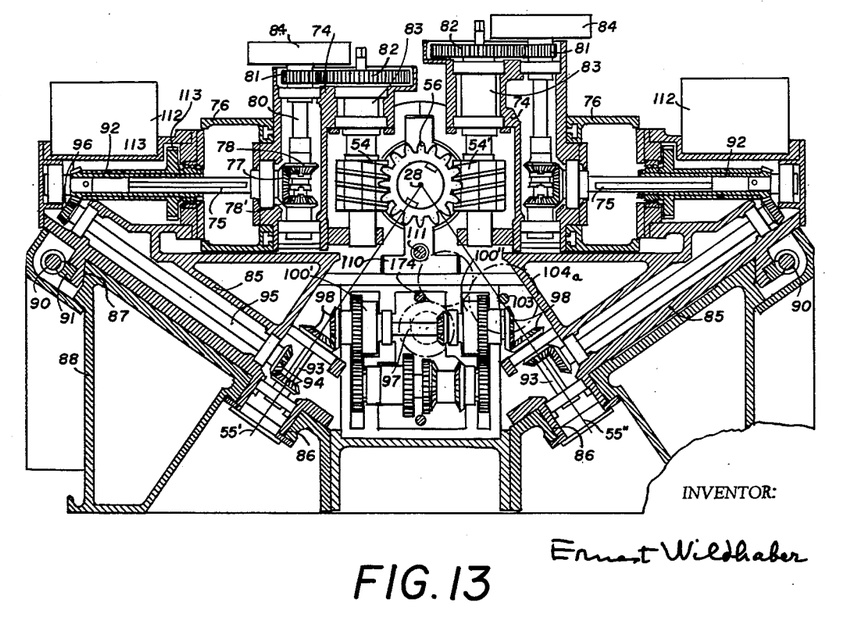
FIG. 13 is a front elevational view and a section along lines 13—13 of FIG. 12 of this machine.

The machine illustrated in FIGURES 12 to 14 is a hobbing machine employing a pair of hobs 54, 54' for cutting opposite sides of the crowned teeth of a workpiece 56. The principles also apply to grinding, in which case helical grinding members of preferably larger diameter are used.

As illustrated, the machine is set up for cutting gear coupling members in accordance with the method described particularly with FIG. 9. The same machine cuts crowned teeth on spur gears in accordance with FIG. 10, and crowned teeth on helical gears.

The machine contains the common features of gear hobbing machines. In addition it has a novel hob feed and especially novel timing-control means.

The conventional features will be gone over lightly. Automatic features, such as automatic loading, automatic feed return, etc. are not shown but may of course be used. Slides are indicated, but their conventional adjustment means and locking means are omitted in the drawings as obvious. In principle adjustment could be made by hand. The standard lubrication and safety features need no illustration either. For convenience straight teeth are shown on the gears, but helical or spiral teeth may also be used. Also while the hob axes are shown in a vertical position the hobs are preferably set to their lead angles as usual, and the description applies to such setting.

Each hob 54, 54' is rotatably mounted in a conventional swivel-head support 74 which can be set angularly on a slide part 76 about the axis of the driving shaft 75. Rigid with shaft 75 is a miter gear 77 that meshes with a pair of coaxial miter gears 78, 78'. These may be selectively coupled to a radial shaft 80. A pinion 81, rigid with shaft 80, meshes with a gear 82 secured to the hob spindle 83. A fly-wheel 84 is fastened to the end of shaft 80, to steady the motion.

Slide 76 is adjustable in the direction of the driving shaft 75 on a swing table 85 with axis 55' or 55'' respectively. These feed axes 55', 55'' lie in a plane perpendicular to the axis 30 of the work spindle and intersect axis 30 at the same point 28. Swing table 85 is rotatably held in a bearing 86 and is movable along circular guide ways 87 that extend about feed axis 55' or 55'' respectively on a part 88 of the machine frame. Feed about the feed axis is effected by a worm 90 rotatably mounted on part 88. Worm 90 meshes with a wormgear segment 91 secured to swing table 85.

Driving shaft 75 receives motion from a sleeve part 92 coaxial therewith. It is slidable therein along a key. Part 92 is operatively connected with a shaft 93 coaxial with the feed axis (55' or 55'') by a pair of miter gears 94, a shaft 95, and a pair of bevel gears 96 of 1:1 ratio. There is one shaft 93 for each hob, both shafts being operatively connected with a central common shaft 97, through bevel gear pairs 98 of 1:1 ratio, and through differentials 100', 100'' respectively. The coaxial members of the bevel gear pairs 98 are rigid with the adjacent sun gear respectively of the differentials 100', 100''.

A miter gear (101, FIG. 19) rigidly connected with shaft 97 meshes with a miter gear 102 secured to a shaft (144) parallel to the work spindle 108, and transmits motion to a shaft 103 parallel thereto through change gears 104a. The axis 103' of shaft 103 is indicated in FIG. 12. Shaft 103 is selectively connected through miter gears 104, 104' or 104, 104'' (FIG. 26) with a vertical shaft 105, whose axis 105' is shown in FIG. 12. Vertical shaft 105 has at its upper end a worm 106 rigid therewith and meshing with a wormgear 107 that is coaxial with the work spindle and that is rotatably mounted on a stationary portion 109 of the machine. A workpiece 56 is secured to the work spindle 108 to move therewith. The work spindle is rotatably mounted on a slide 110 movable in the direction of the work spindle axis 30. Movement is controlled by a feed screw 111. End 108' of spindle 108 extends into the hub of wormgear 107 and is connected therewith by sliding splines. These constrain the work spindle to turn with wormgear 107 while permitting axial motion.

Power is applied at any suitable place along this gear train. In this embodiment a pair of electric motors, preferably direct current motors 112, are mounted on the respective swing tables 85 and drive the sleeve part 92 through a gear 113 rigid therewith, by means of change gears (not shown).

The described gear train interconnects the hob supports and the work spindle or work support so that said supports are rotated in timed relation.

During the feed the timing between the hobs and workpiece is gradually changed in accordance with a predetermined pattern. One part of this pattern controls the crowning and has already been described. The other part is inherent in the machine function and will now be described. The hobs are fed about the respective feed axes (55', 55'') as if rigid with swing table 85, in addition to their timed rotation and the already described timing change. This means that shaft 93 of each side should turn with the swing table, in addition to its described rotation. It means also that the coaxial bevel gears of the two pairs 98 should additionally turn in the same direction through the angle of the angular feed. The angular feed is preferably at a uniform rate, and the said additional turning motion is then also at a uniform rate. It is in the same direction on both hobs, being either added on both hobs to their rotation or subtracted on both hobs therefrom.

Accordingly the task is to provide a uniform timing change in the same direction on both hobs, and a varying timing change in opposite directions on the two hobs. The timing control will be described hereafter with FIGURES 19 and 20.

This timing control is also applicable to the machine embodiment to be described with FIGURES 15 to 18. It is in some respects simpler than the one just described, but is confined to couplings of smaller shaft angularity when using the less expensive cylindrical hobs or cylindrical tools, and to gears. Large shaft angularities can however be handled with taper hobs or taper tools.

When cutting spur gears and helical gears having crowned tooth sides with either machine, the conventional feed motion along the axis of the workpiece is used. This bodily feed is here imparted to the workpiece. Slide 110 is fed by turning feed screw 111 in proportion to the turning motion of the workpiece. There is no angular feed about axis 55' or 55''.

To produce helical gears the conventional timing change is made. It is directly proportional to the rotation of the work spindle and is in the same direction on both hobs as compared with the direction of their rotation. The timing change for crowning however is in opposite directions on the two hobs and is at a varying rate which reverses in or adjacent the central feed position.

As on gear coupling members the complete timing change is made up of a uniform change applied in the same direction to both hob spindles, and of a varying change applied in opposite directions to the two hob spindles.

Figure 15:
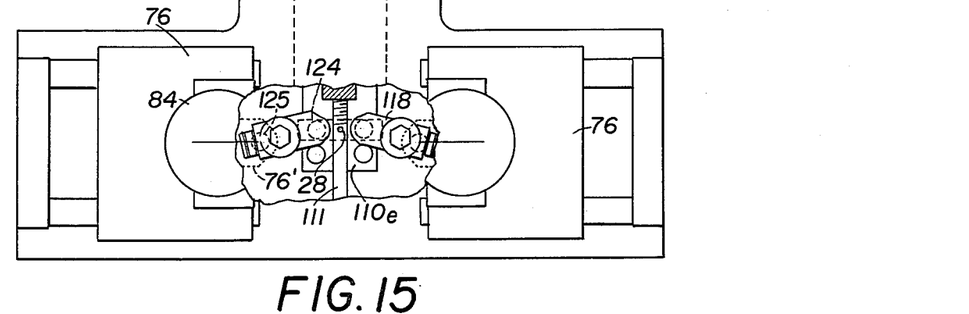
FIG. 15 is a somewhat diagrammatic plan view like FIG. 12, partly a horizontal section taken below the work spindle, of a modified hobbing machine for carrying out the method of the present invention.
Figure 16:
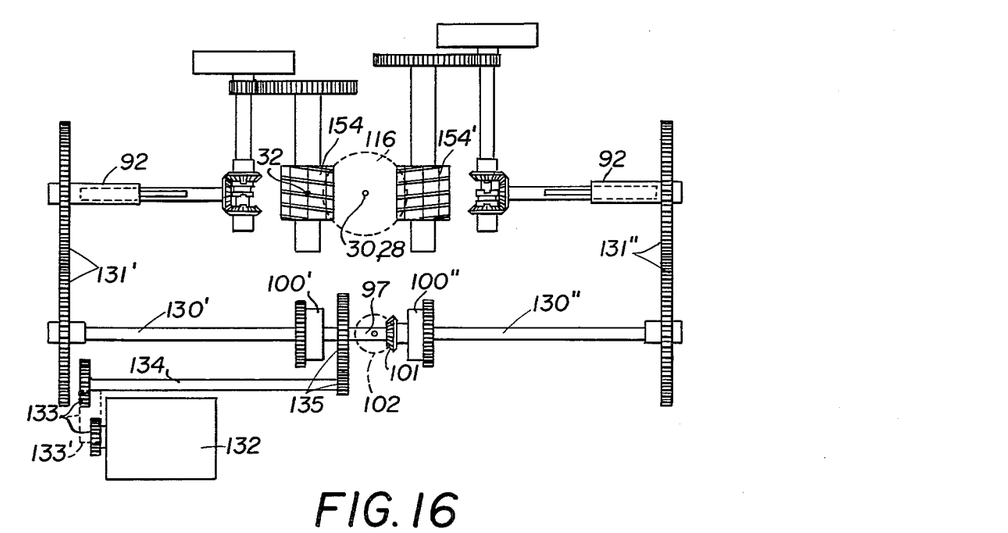
FIG. 16 is a view taken in the direction of the axis of the work spindle of the machine shown in FIG. 15, illustrating the main gear train that interconnects the hob spindles with the work spindle.

The machine embodiment of FIGURES 15 and 16 lacks the feed about the inclined feed axes 55', 55'' but is otherwise similar to the described embodiment, and also mounts a pair of hobs (154, 154') on diametrically opposite sides of the workpiece (116). Unless otherwise stated, the same numerals denote the same parts as in the described embodiment.

For producing coupling members, the bodily relative motion between each hob and the workpiece is a circular translation, that is a circular motion without turning the hob about the center of the circle about which it is fed. Each of the two opposite circular feed motions is made up of a component axially of the workpiece and of a component radially thereof. The axial component is performed by the workpiece and is common for both hobs. The radial component is in opposite directions on the two hobs and is performed by the radial slides 76. The forces required to constrain this radial component are opposite and approximately balance each other.

Figure 17:
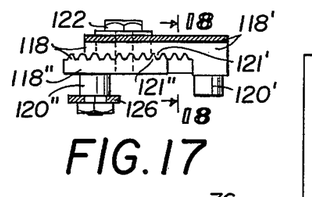
FIG. 17 is a side view and section taken along lines 17—17 of FIG. 18, of an adjustable link used in the above machine.
Figure 18:
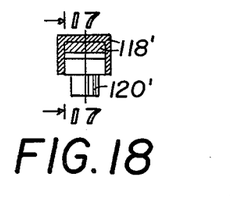
FIG. 18 is a section taken along lines 18—18 of FIG. 17.

The feed motion component axially of the workpiece is effected by feed screw 111 operated as in the described embodiment. The radial fed component is derived from the axial motion of slide 110 by a pair of links 118 (FIGS. 15, 17, 18). Each link 118 comprises two parts 118', 118'' having cylindrical journal projections 120', 120'' respectively at opposite ends. The parts 118', 118'' contain matching rack portions 121', 121'' for stepwise adjustment of the distance between the journal projections. The rack portions are formed integral with the respective journal projections. A U-shaped bar (FIG. 18) is rigidly secured to part 118', to straddle the sides of part 118'' so as to hold it laterally in the direction of the rack teeth. The two parts 118', 118'' are held together by a screw 122 threading into part 118''.

To change the distance between journal projections 120', 120'' the screw 122 is unfastened, and part 118' is lifted up from part 118'' so that the rack teeth are disengaged. They are then reengaged in a position shifted through one or more teeth or pitches relatively to one another, and screw 122 is fastened again.

FIG. 15 shows a feed position at the start of the hobbing operation. In the central feed position the pair of links 118 are aligned with each other. At the feed end the links are inclined in the opposite direction.

The journal projections 120' of the two links 118 pivotally engage parallel spaced bores 124 provided on projection 110e of slide 110. The said bores are aligned with each other axially of the work spindle. The journal projections 120'' of the pair of links pivotally engage bores 125 provided on the center line of the respective slides 76, on projections 76' thereof. The journal projection 120'' is held in an axially fixed position in its bore by a disk 126 (FIG. 17) bearing against the underside of slide projection 76'.

In operation the slide 110 advances in the direction of the work axis (30) and first pushes the slides 76 back, away from the center, and then draws them in again. The distance between pins 120', 120'' is preferably made approximately equal to the distance of the hob center 32 from a center 28 that lies on the axis of the work spindle. The relative path of the hob center 32 with respect to the workpiece is a circular arc whose radius equals the distance between said pins or journal projections. Additional or modified crowning is attained with one or more of the factors enumerated, especially by timing control.

The sleeve parts 92 (FIG. 16) are connected with coaxial shafts 130', 130'' by gear pairs 131', 131'' respectively. The shafts 130', 130'' are rigid with the adjacent sun gear of the differentials 100', 100'' respectively. As before, the other sun gear of each differential 100', 100'' is rigid with a common shaft 97, which also carries miter gear 101. The latter meshes with a miter gear 102 and transmits motion to the work spindle in the manner already described.

In this embodiment the drive is applied preferably to shaft 97. An electric motor 132 drives shaft 97 through change gears 133, a shaft 134 and a gear pair 135. The gear member of this pair is rigid with shaft 97. An idler 133', shown in dotted lines, represents the coaxial intermediate gears of the compound change gears 133.

The differentials 100', 100'' are identical with the ones of the first-described embodiment. They will now be further described, together with the complete timing control.

*The Timing Control*

The two identical differentials 100', 100'' shown in

Figure 19:
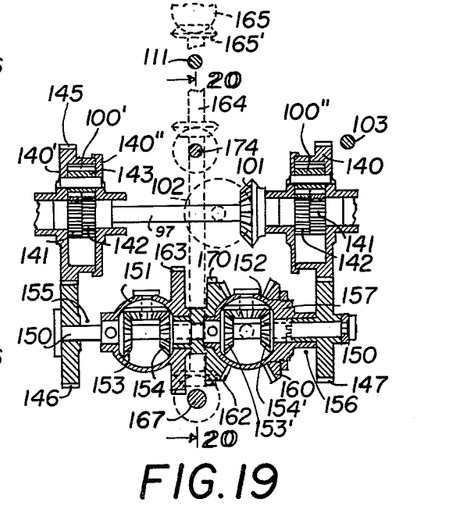
FIG. 19 is a fragmentary section like FIG. 13 at a larger scale, taken along lines 19—19 of FIG. 20, and showing the timing-control differentials.

FIG. 19 are of the spur gear type. This known type uses many more turns of the planet carrier 140 to turn the sun gears 141, 142 one revolution relatively to each other. It thus enables us to do away with an extra speed reduction in the timing-control train, which is required when conventional bevel-gear differentials are used.

Figure 20:
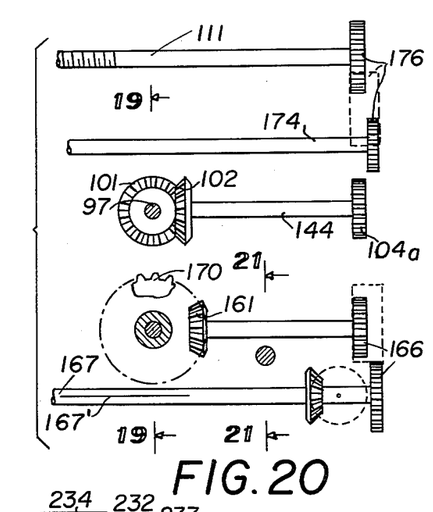
FIG. 20 is a section taken along lines 20—20 of FIG. 19, looking in the direction of the arrows.
Figures 24, 25, 26:
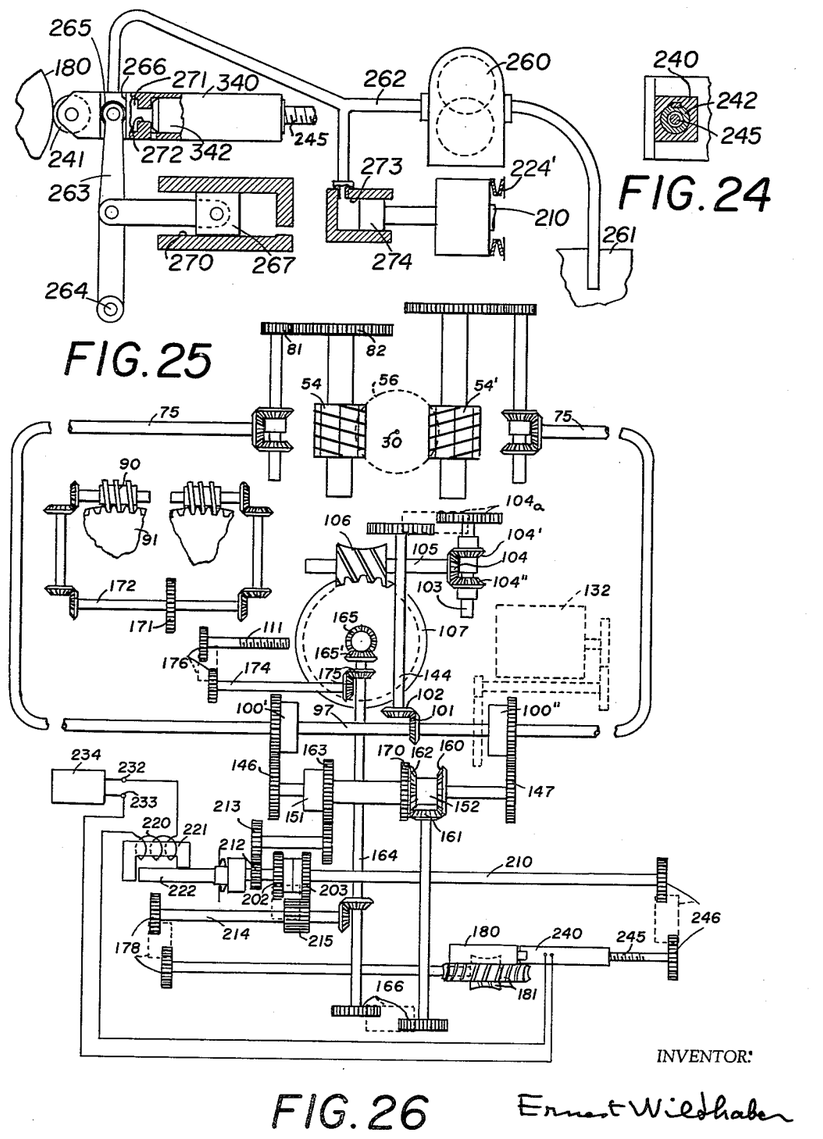
FIG. 24 is a cross-section taken along lines 24—24 of FIG. 21.
FIG. 25 is a diagram illustrating a modified form of servo means, for operating the varying rate timing control.
FIG. 26 is a drive diagram applicable to either of the two machine embodiments described, showing all the essential connections.

The coaxial sun gears 141, 142 have the same blank dimensions, but their tooth numbers differ by one tooth. For instance they may have 20 and 21 teeth respectively. They mesh with a single wide-faced planet pinion 143. If the planet carriers 140 stand still, and shaft 97 with its sun gears 142 makes 20 turns, the sun gears 141 of both differentials turn through 21 revolutions in the above instance. This difference is allowed for in the selection of the change gears 104a. When the planet carriers 140 stand still, that is at zero feed rate, the turning ratio between each hob spindle and the work spindle equals the ratio between the tooth number N of the workpiece and the thread number $n_h$ of each hob. Ordinarily hobs with single threads are used, $n_h=1$. The change gear ratio depends also on the fixed machine reductions. If the tooth ratio of the wormgear pair 107, 106 at the work spindle is say 30 times larger than the ratio of the gear pair 82, 81, then the ratio of the change gears 104a should be $$\frac{N}{30 \cdot n_h} \cdot \frac{20}{21} = \frac{2N}{63 \cdot n_h}$$

in the above instance. When single-thread hobs are used, this ratio may be accomplished with a 63 tooth gear mounted on the shaft 144 (FIG. 20) of miter gear 102, a gear with twice the number of teeth of the workpiece mounted on shaft 103 (see also FIG. 26), and an idler connecting the two change gears. With double-threaded hobs, the change gear on shaft 103 should have the same tooth number as the workpiece.

When shaft 97 with sun gears 142 stands still, and the planet carrier 140 instead makes 20 turns in the opposite direction as compared with the above considered rotation of shaft 97, sungear 141 continues to turn in the same direction as before, but by only one turn. In this example it thus takes 20 turns of planet carrier 140 to turn sungear 141 through one revolution with respect to sun gear 142.

Planet carrier 140 is composed of a main portion 140' with gear teeth 145, and of an end portion 140" rigidly secured thereto. The gear teeth 145 of the differentials 100', 100" are engaged by coaxial and relatively movable gears 146, 147. Gear 146 is rigidly secured to a shaft 150 that reaches all the way to gear 147 through two bevel-gear differentials 151, 152. The side gears 153, 153' of differentials 151, 152 are rigidly connected with shaft 150. Side gear 154' of differential 152 is rigidly connected with gear 147, by means of matching coupling teeth provided on the adjacent hub ends of said gears. Bearing support is at 155 and 156.

The planet carrier 157 of differential 152 contains a ring gear 160 rigidly secured thereto by keys and a nut. A bevel pinion (161 in FIGS. 20, 26) drives ring gear 160 as well as an opposite ring gear 162 rotatable on planet carrier 157, to turn equally in opposite direction. Gear 162 is rigid with side gear 154 of differential 151, it being rigidly connected thereto. The planet carrier of differential 151 is formed integral with a cylindrical gear 163 through which it receives motion.

The bevel pinion 161 that drives planet carrier 157 derives its motion from a shaft 164 connected during the cut by miter gears 165, 165' with the wormgear 107, and through further shafts turning at the same ratio. In the idle period between unloading and loading the miter gear 165 is disconnected from the wormgear 107 and turned back at high speed to starting position by conventional means not shown. It is then reconnected with said wormgear. Bevel pinion 161 is driven through change gears 166 from a shaft 167 (FIGS. 19, 20) geared to shaft 164 at a 1:1 ratio. Accordingly the ring gears 160, 162 turn uniformly during hobbing, in direct proportion to the work support.

The opposite side gears 153', 154' of bevel-gear differential 152 are geared to the planet carriers of the differentials 100', 100" respectively, so that the turning motion of planet carrier 157 represents their average timing motion. In hobbing gear-coupling members with angular feed about axes 55', 55", differential 152 adds this angular feed motion in the proper direction to the turning motion of the sun gears 141 of the differentials 100', 100".

The angular feed motion is operated through a gear 170 formed integral with ring gear 162. No change gears are here needed. Gear 170 drives a gear 171 (FIG. 26) through one or more intermediate gears not shown. Gear 171 is rigid with a shaft 172 and drives the worms 90 and wormgear segments 91 through miter gears and intermediate shafts to effect the angular feed.

To hob cylindrical gears, this angular feed is locked out after disconnecting the gear train, and instead the feed screw 111 is turned in time with the rotation of the work spindle. A shaft 174 is connected with said shaft 164 by a pair of miter gears (175, FIG. 26) and imparts motion to the feed screw 111 by change gears 176 (FIGS. 20, 26). An idler may be added to reverse the rotational direction. The timing change needed on helical gears is effected in the manner described by differential 152 and change gears 166.

In the embodiment of FIGURES 15 and 16 the feed screw 111 is used also for gear-coupling members and provides the feed component axially of the work spindle.

Figure 21:
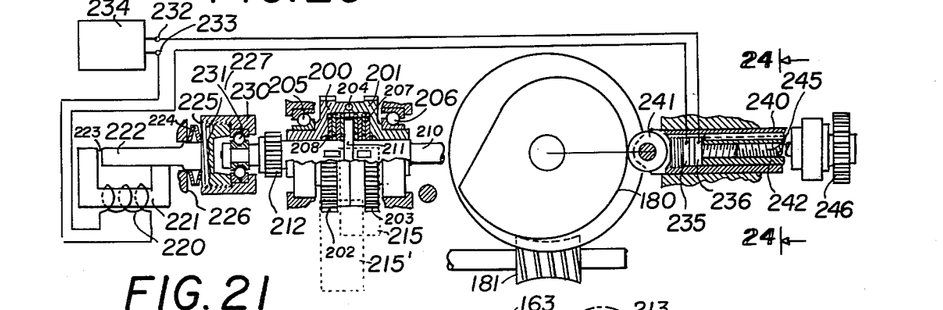
FIG. 21 is partly a section taken along lines 21—21 of FIG. 20, and is further a diagram showing the operation of the varying rate timing control with servo means.

The differential 151 serves to change the timing in opposite directions on the two hob spindles, at a varying rate, to control crowning. The varying turning motion of its planet carrier is controlled by a cam 180 (FIG. 21). The cam is geared to shaft 164 by a wormgear and worm 181, by change gears 178 and by miter gears (FIG. 26). Gears 178 are shown in dotted lines in FIG. 22.

Accordingly the cam 180 turns during the cutting cycle through an angle that can be chosen at will. Also means are provided for changing the scale of the cam motion, as will be further shown. Through this choice and the scale change provided a given cam can be adapted to a wide field of application, whereas a cam that makes a complete turn per cutting operation applies only to a given job or to a narrow field.

To effect relatively small timing changes the cam (180) could be made to act directly on the planet carrier 177 without outside help. However when the cam 180 acts through a servo mechanism, this permits to magnify the timing changes produced, so that the same cam is applicable in a much wider range, without reaching excessive dimensions.

*Servo-Mechanism*

The driving power of the servo-mechanism or servo means is derived from a pair of coaxial and oppositely rotating slipping clutches 200, 201 (FIG. 21). These are provided with teeth 202, 203 on their outside. The outer parts of the clutches 200, 201 are of cup form, with their open sides facing each other. The facing sides are each provided with a V-shaped groove. These are filled with balls 204 and form a thrust bearing. The clutches are further rotatably mounted in an axially fixed position by bearings 205, 206 respectively.

Disks 207 are secured by splines to said outer parts. Other disks 208 alternate with the disks 207 and are splined to a shaft member 210 on opposite sides of a central flange 211. The disks are preferably running in thin oil.

When shaft member 210 is held stationary, the disks 208 on one side of flange 211 slide in one direction on the adjacent disks 207; and the disks 208 on the opposite side of flange 211 slide in the opposite direction on the adjacent disks 207. Axial pressure exerted in one direction on shaft member 210 causes the disks on one side of the flange 211 to engage under more pressure, so that torque is exerted on member 210 in the direction of rotation of the clutch whose disks 207 are under increased pressure. Similarly axial pressure exerted on member 210 in the opposite direction causes opposite torque to be exerted thereon.

Figure 23:
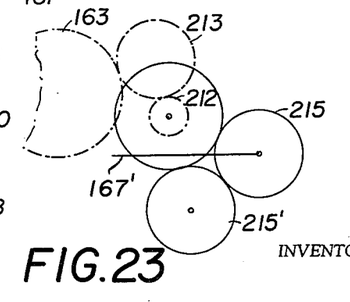
FIG. 23 is a diagram showing the drive of the clutches 200, 201 shown in FIG. 21.

A pinion 212 rigid with shaft member 210, that is rigidly secured thereto, drives the gear 163 of differential 151 through intermediate gears 213 (FIGS. 23, 26).

Figure 22:
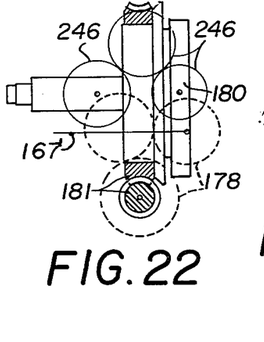
FIG. 22 is an axial section of the cam-carrying worm-gear shown in FIG. 21 and a view of the supporting parts, showing also diagrammatically change gears used in the timing control.

The opposite clutches (200, 201) are driven through a shaft 214 (FIG. 26) which is geared to shaft 164 through another shaft 167 (FIGS. 19, 20). The center line 167' of the latter is also shown in FIGS. 22 and 23. Shaft 214 carries a wide-faced pinion 215 rigid therewith (FIGS. 26, 21, 23), that meshes with the teeth 203 of clutch 201. It also meshes with another similar pinion 215' that is shifted axially with respect to pinion 215, and that meshes with the teeth 202 of clutch 200, thereby rotating it in opposite direction as compared with clutch 201. The rotation of the clutches should be at a speed larger than the maximum speed required to produce the motion prescribed by cam 180.

The axial pressure on shaft member 210 is controlled by a solenoid 220 wound around a stationary core 221 of armature iron, that forms a magnetic circuit with a part 222 of similar material. Part 222 is movable in the direction of shaft member 210. Current in the solenoid tends to draw part 222 to the left, to reduce the width of the gap 223. At a given amount of current the magnetic pull is balanced by Belleville-type springs 224 that tend to increase the distance between shoulder 225 and stationary shoulder 226. Shoulder 225 is formed at one side of a head 227 rigid with part 222. Head 227 threads into a cup 230, and together with it holds the outer race of a bearing 231 capable of transmitting axial thrust in both directions. The inner race of said bearing is secured to one end of shaft member 210.

When the electric current in the solenoid 220 increases, the magnetic pull exceeds the spring pressure and draws part 222 and shaft member 210 to the left, so that torque and motion is transmitted to member 210 in the direction of rotation of clutch 200. When the current in the solenoid drops, the spring pressure outweights the magnetic pull, pressing shaft member 210 to the right, so that opposite torque and motion is transmitted to it.

The electric current in the solenoid 220 is made dependent on the turning position of cam 180. Voltage is applied to two terminals 232, 233 by any suitable source, for instance a direct-current generator 234 coupled to a motor. The electric current passes through solenoid 220 and parts 235, 236. Part 235 is insulated from but rigid with a slide 240 that is movable in a direction radial of cam 180 and that carries a roller 241, or more broadly an abutment. Slide 240 is pressed towards cam 180 for contact with the roller by known means not shown, for instance hydraulic pressure. Part 236 is rigid with a sleeve 242 (see also FIG. 24) that is slidably keyed to slide 240 and is movable inside of it in the same direction as the slide. The two parts 235, 236 may contact directly or through an intermediate element. Sleeve 242 is threaded on its inside and is engaged by a screw 245. The screw 245 is rotatably mounted in an axially fixed position on a portion rigid with the machine frame. It is turned in proportion to the turning motion of shaft member 210 by changeable gear means, such as compound change gears 246 whose intermediate member is shown dotted in FIG. 26. Accordingly the ratio between shaft member 210 and screw 245 is adjustable.

The electric resistance between parts 235, 236 depends on the proximity of the contacting surfaces. The resistance decreases with increasing proximity. It increases when the slightest gap is formed.

When shaft 210 rotates so much that the sleeve 242 is pressed more than required into slide 240, the resistance decreases and more electric current flows in the solenoid 220. Torque is exerted on shaft 210 in the direction of rotation of clutch 200. When shaft 210 turns in this direction the screw 245 should turn in a direction to pull sleeve 242 away from the cam 180. This direction can be controlled with an idler which may or may not be added to the change gears 246, depending on the directions of rotation. When the contact portions at 235, 236 tend to separate, the electric resistance increases and the current in the solenoid 220 drops. More torque is exerted on shaft 210 in the direction of rotation of clutch 201, tending to rotate said shaft in that direction and thereby moving sleeve 242 towards cam 180 and into closer contact with part 235.

It should be understood that the described displacements between the slide 240 and sleeve 242 are tiny, as the resistance can be made to vary substantially with very slight displacements. The motion applied to the planet carrier of differential 151 thus corresponds to the cam profile and the change gears used.

FIG. 25 illustrates a modified servo-mechanism. It is based on hydraulic action. A gear pump 260 is driven at a constant speed, and pumps liquid from a sump 261 to a pressure line 262.

Cam 180 is engaged by the roller 241, or abutment, of a slide 340 that contains a sleeve 342 movable therein along a key in the direction of the slide motion. A screw 245 is rotated as above described and determines the position of sleeve 342 engaged thereby. If desired, slide 340 may be pressed towards cam 180 by a lever 263 pivoted at 264. A roller 265 is mounted at one end of lever 263 and engages a straight slot 226 provided on slide 340. The lever 263 is pressed to the left by a piston 267 movable in a cylinder 270, to which pressure fluid from any suitable source is admitted.

One duct of pressure line 262 leads to a cavity 271 provided in slide 340. Fluid will leak out of this cavity increasingly the more loosely the closed end of sleeve 342 contacts the slide 340 adjacent bore 272. Accordingly the pressure in cavity 271 and in line 262 drops the more sleeve 342 tends to lag back of slide 340.

A branch of pressure line 262 leads to a hydraulic cylinder 273 in which a piston 274 is axially movable. Piston 274 is connected with the aforesaid shaft member 210 in the manner described for part 222. Belleville-type springs 224' press the piston 274 to the left, to hold balance to a given hydraulic pressure. The resultant axial pressure, and the torque applied to shaft member 210 depends therefore on the position of sleeve 342 in slide 340, as before.

*Drive Diagram and General Remarks*

A drive diagram shows all the essential connections, but not the position of the shafts and gears. Unessential connections, as 1:1 ratio bevel gears to turn corners, have sometimes been omitted and replaced by diagrammatic lines defining the connection. The same numerals denote the same parts or equal parts. Motion is applied by motor means somewhere along the main gear train. One such position is indicated in dotted lines, the motor being denoted at 132.

An important feature of the invention is the timing control such that a single control cam (180) can do for both hobs or rotary tools. Also it should be noted that this cam is a swinging cam that moves in one direction during the cut and is returned to starting position during the off time, that the amount of swing is adjustable, and that the scale of the motion derived from said cam can be changed at will. This applies to cams used with or without servo-mechanism. It should also be noted that the timing change provided is resolved into a uniform-motion component and into a varying-rate component that is zero near the middle position of the feed and reverses there. In this way the throw of the cam (180) can be reduced, or a larger scale can be used to give improved control.

In the described embodiment the differentials 151, 152 have a side gear (153, 153') rigid with one another; and the planet carrier of one differential (152) receives uniform motion while the planet carrier of the other receives varying motion. A differential contains three coaxial elements movable relatively to each other, namely two sun gears and a planet carrier with planet. More broadly one element (153, 153') of each differential (151, 152) is rigid with one element of the other differential. Uniform motion is applied to another element of one differential; and varying motion is applied to another element of the other differential.

In the embodiment described but not illustrated where the cam (180) acts without servo mechanism on differential 151, the differentials 100', 100'' (FIGS. 13, 16) are preferably conventional bevel-gear differentials, and a gear reduction is used between shafts 164 and 167.

While the invention has been described with several different embodiments thereof, it will be understood that it is capable of further modification, and this application is intended to cover any variations, uses or adaptations of the invention following, in general, its principles and including such departures from the present disclosure as come within known or customary practice in the art to which the invention pertains, and as fall within the scope of the invention or the limits of the appended claims.

I claim:

1. The method of generating crowned sides on the teeth of a workpiece, which comprises providing a pair of separate rotary tools movable relatively to each other and each having cutting portions disposed in a line inclined to the peripheral direction of the tool, positioning said tools adjacent said workpiece to engage opposite sides of the teeth of said workpiece, rotating said tools and said workpiece on their respective axes in time with each other, effecting feed motion between said tools and said workpiece lengthwise of said teeth, and controlling crowning by gradually and oppositely changing the timing of the rotation of said tools relative to the rotation of the workpiece at a varying rate, the angular turning position of one tool being successively advanced and retarded while the angular turning position of the other tool is successively retarded and advanced as the tools are fed relative to the workpiece lengthwise of said teeth so that one tool will follow the longitudinally crowned surface on one side of said teeth and the other tool will follow the longitudinally crowned surface on the opposite side of said teeth.

2. The method of generating crowned sides on the teeth of a workpiece according to claim 1, wherein the tools are generally cylindrical members each having cutting edges disposed in at least one thread, and wherein said tools are positioned on diametrically opposite sides of the workpiece.

3. The method of generating crowned sides on the teeth of a gear-coupling member, which comprises providing a pair of separate rotary tools, each tool having cutting portions disposed in at least one thread, positioning said tools adjacent a gear-coupling member to be processed, rotating said tools and said member on their respective axes in time with each other, effecting feed motion between said tools and said member lengthwise of said teeth so that a mean point on the axis of each tool describes a curved path concave towards the said member, and gradually and oppositely changing the rotational timing of said two tools at a varying rate as compared with the rotation of said member, the angular turning position of one tool being successively advanced and retarded while the angular turning position of the other tool is successively retarded and advanced as the tools are fed relative to said member lengthwise of said teeth, to cause one tool to follow the longitudinally crowned surface at one side of the teeth and the other tool to follow the longitudinally crowned surface at the other side of the teeth.

4. The method of generating crowned sides on the teeth of a gear-coupling member according to claim 3, wherein the tools are generally cylindrical members positioned on diametrically opposite sides of the gear-coupling member to be processed, and wherein said tools are fed about different axes inclined to each other and intersecting each other.

5. The method of generating crowned sides on the teeth of a gear-coupling member, which comprises providing a rotary tool having cutting portions disposed in at least one thread, positioning said tool adjacent a gear-coupling member to be processed to engage one side of its teeth, rotating said tool and member on their respective axes in time with each other, and feeding said tool angularly about an axis inclined at right angles to the direction of the axis of said member and offset from the axis of said tool a distance smaller than the outside radius of said member.

6. The method of generating crowned sides on the teeth of a gear-coupling member according to claim 3, wherein the two rotary tools have cutting portions disposed in helical threads of opposite hand, right hand and left hand respectively.

7. The method of generating crowned sides on the teeth of a cylindrical gear, which comprises providing a pair of rotary tools each having cutting portions disposed in at least one thread, positioning said tools on diametrically opposite sides of a cylindrical gear to be processed to engage opposite sides of its teeth, rotating said tools and said gear on their respective axes in time with each other, effecting feeding motion between said tools and gear in the direction of the axis of said gear, and effecting crowning by gradually and oppositely changing the rotational timing of said tools at a varying rate as compared with the rotation of said gear, the angular turning position of one tool being successively advanced and retarded while the angular turning position of the other tool is successively retarded and advanced as the tools are fed relative to said gear in the direction of said gear axis, to cause one tool to follow the longitudinally crowned surface at one side of said teeth and the other tool to follow the longitudinally crowned surface at the other side of said teeth.

8. The method according to claim 7 for generating crowned tooth sides on helical gears, wherein in addition the hob timing is changed in direct proportion to the axial feed motion, in the same direction on both hobs, so that the effective feed is lengthwise of the helical teeth.

9. The method of hobbing gear teeth, which comprises providing a pair of hobs, each of said hobs having cutting edges disposed in at least one helical thread, the pressure angle of each hob being smaller than the pressure angle of the teeth to be produced and being between zero and twelve degrees, positioning said two hobs on diametrically opposite sides of a workpiece to engage opposite tooth sides thereof respectively, rotating said hobs and workpiece in time on their respective axes, effecting feed motion between said hobs and workpiece, and changing the timing of the relative rotation of said hobs and workpiece during said feed motion.

10. A machine for producing crowned tooth sides, which comprises a work support for rotatably mounting a work piece, a pair of tool supports for rotatably mounting a pair of tools adjacent said workpiece to operate simultaneously on opposite sides, respectively, of the teeth of the workpiece, means for rotating said tool supports and said work support on their respective axes in time with each other, means for effecting feed motion between said tool supports and work support along the teeth of said workpiece, and means for turning both tool supports relative to the work support at a gradually varying rate, the rate varying more for one tool support than for the other tool support.

11. A machine according to claim 10, wherein the means for changing the timing between each tool support and the work support comprise two coaxial differentials, each of said differentials having three coaxial elements, namely two sun gears and a planet carrier with planet, one element of each of said differentials being rigidly connected with one another and being operatively connected with said work support, another element of each of said differentials being operatively connected with said two tool supports respectively, and means for turning the remaining element of each of said differentials independently of one another and at a varying rate.

12. A machine according to claim 10, wherein the means for changing the timing between each tool support and the work support comprise two coaxial differentials, each of said differentials having three coaxial elements, namely two sun gears and a planet carrier with planet, a sun gear of each of said differentials being rigid with one another and being operatively connected with said work support, the other sun gear of each of said differentials being operatively connected with said two tool supports respectively, and means for turning the planet carriers of said differentials independently of one another and at a varying rate.

13. A machine according to claim 11, wherein the means for turning the remaining element of each of said two differentials comprise means for transmitting the average timing change of the two tool supports, and separate means for transmitting the difference of the timing change of the two tool supports.

14. A machine according to claim 11, wherein the means for turning the remaining element of each of said two differentials comprise a pair of coaxial rotary parts geared to said remaining elements respectively, a bevel-gear differential whose opposite side gears are rigid with said pair of parts respectively, means for turning the planet carrier of said bevel-gear differential in timed relation to the turning motion of said work support, another bevel-gear differential coaxial with the first-named one and having one of its side gears rigid with a side gear of the first-named bevel-gear differential, means for transmitting to the other side gear of the last-named differential a turning motion equal and opposite to the turning motion of the planet carrier of the first-named bevel-gear differential, and cam controlled means for transmitting turning motion to the planet carrier of the last-named differential.

15. A machine according to claim 11, wherein the means for turning the remaining element of each of said two differentials comprise a pair of coaxial rotary parts geared to said remaining elements respectively, a further pair of differentials coaxial with said parts and operatively connected therewith, means for turning one element of one differential of said further pair at a constant rate, in proportion to the turning motion of said work support, and cam-operated means for turning one element of the other differential of said further pair at a predetermined varying rate.

16. In a machine for producing crowned tooth sides on a workpiece, a work support for rotatably mounting a workpiece, a tool support for rotatably mounting a rotary tool, means for rotating said supports on their respective axes in time with each other, said means comprising a gear train with differential, means for effecting feed motion between said supports to displace said tool relatively to the workpiece lengthwise of the teeth being produced, means for turning one element of said differential at a varying rate during said feed motion, and differential means for making up said varying rate of two components, of a constant component and of a varying component with reversal, changeable gear means for deriving said constant component from a shaft geared to one of said supports during the cutting process, cam means for operating said varying component, and changeable gear means for applying motion to said cam means.

17. In a machine for producing crowned tooth sides on a workpiece, a work support for rotatably mounting a workpiece, a tool support for rotatably mounting a rotary tool, means for rotating said supports on their respective axes in time with each other, said means comprising a gear train with differential, means for effecting feed motion between said supports to displace said tool relatively to the workpiece lengthwise of the teeth being produced, means for turning one element of said differential at a varying rate during said feed motion, cam means for providing at least a part of the turning motion of said one element, said cam means comprising a swinging cam, changeable gear means for swinging said cam through a selectable angle during the cutting process, and means for changing the scale of the motion derived from said cam and transmitted to said one element.

18. In a machine for producing crowned tooth sides on a workpiece, a work support for rotatably mounting a workpiece, a tool support for rotatably mounting a tool, means for rotating said supports on their respective axes in time with each other, said means comprising a gear train with differential, means for effecting feed motion between said supports to displace said tool relatively to the workpiece lengthwise of the teeth being produced, and means for changing the timing between said supports at a varying rate during said feed motion, the last-named means containing cam means for controlling said varying rate, and servo means for turning one element of said differential in accordance with the cam shape.

19. In a machine for producing crowned tooth sides on a workpiece, a work support for rotatably mounting a workpiece, a tool support for rotatably mounting a tool, means for rotating said supports on their respective axes in time with each other, means for effecting feed motion between said supports to displace said tool relatively to the workpiece lengthwise of the teeth being produced, and means for changing the timing between said supports at a varying rated during said feed motion, said means containing a shaft connected to operate said timing change, a cam, a movable abutment contacting said cam, a part constrained to move in the same path as said abutment, means geared to said shaft for displacing said part along said path, and servo-means for turning said shaft in accordance with the relative position of said abutment and said part.

20. A machine for producing crowned tooth sides, which comprises a work support for rotatably mounting a workpiece, a pair of tool supports for rotatably mounting a pair of tools adjacent to and on diametrically opposite sides of said workpiece, means for rotating said tool supports and said work support on their respective axes in time with each other, means for effecting feed motion between said tool supports and work support to relatively move said tool supports in opposite arcs about said work support lengthwise of the tooth sides of the workpiece, and means for changing the rotational timing between said tool supports and work support at a gradually varying rate.

21. A machine according to claim 20, wherein said means for effecting feed motion comprise a pair of circular slides on which the tool supports are mounted, guide means constraining said slides to move about different axes intersecting the axis of said work support and lying in a plane perpendicular to the last-named axis, and means for moving said slides.

22. A machine according to claim 20, wherein said means for effecting feed motion comprise an axial slide carrying the work support and being movable in the direction of the axis of said work support, a pair of opposite radial slides carrying the respective tool supports and being movable at right angles to said axial slide, and a pair of links connecting said axial slide with said radial slides, so that on motion of said axial slide the radial slides are moved away from and towards said work support.

References Cited in the file of this patent

UNITED STATES PATENTS

| | | |
|---|---|---|
| 1,267,970 | Burgess | May 28, 1918 |
| 2,736,239 | Higashi et al. | Feb. 28, 1956 |
| 2,788,567 | Stibitz | Apr. 16, 1957 |

FOREIGN PATENTS

| | | |
|---|---|---|
| 531,563 | Great Britain | Jan. 7, 1941 |